United States Patent [19]

Dakroub et al.

[11] 4,344,036

[45] Aug. 10, 1982

[54] SKIP COUNT CLOCK GENERATOR

[75] Inventors: Housan Dakroub, Dearborn Heights; David J. Concannon, Ypsilanti, both of Mich.

[73] Assignee: Burroughs Corporation, Detroit, Mich.

[21] Appl. No.: 114,984

[22] Filed: Jan. 24, 1980

[51] Int. Cl.³ .................... H03K 3/72; H03K 21/30
[52] U.S. Cl. .................... 328/61; 235/92 CC; 364/703; 328/48; 328/120
[58] Field of Search ............ 328/41, 42, 46, 48, 328/120, 59, 61, 14; 364/703, 900; 235/92 CC

[56] References Cited

U.S. PATENT DOCUMENTS

| | | | |
|---|---|---|---|
| 3,976,945 | 8/1976 | Cox | 328/14 |
| 4,031,476 | 6/1977 | Goldberg | 328/48 |
| 4,101,838 | 7/1978 | Aihara et al. | 328/63 |
| 4,184,068 | 1/1980 | Washburn | 235/92 CC |
| 4,223,392 | 9/1980 | Lemaire et al. | 364/900 |
| 4,241,408 | 12/1980 | Gross | 364/703 |

Primary Examiner—John S. Heyman
Attorney, Agent, or Firm—Delbert P. Warner; Kenneth J. Cooper; Charles E. Quarton

[57] ABSTRACT

A skip count clock generator yielding multiple frequencies of clock pulses for variably driving a scanner to produce a required resolution of scanned data includes a base frequency generator of clock pulses and a device for establishing a periodic clock pulse cycle. An electrical logic circuit is used to skip any chosen whole number of clock pulses in a period to yield a desired fraction of the clock pulse cycle.

7 Claims, 7 Drawing Figures

| A | B | C | $\overline{A}$ | B | C | $\overline{A}BC$ | $\overline{\overline{A}BC}$ (Output of Gate 1) |
|---|---|---|---|---|---|---|---|
| 0 | 0 | 0 | 1 | 0 | 0 | 0 | 1 |
| 0 | 0 | 1 | 1 | 0 | 1 | 0 | 1 |
| 0 | 1 | 0 | 1 | 1 | 0 | 0 | 1 |
| 0 | 1 | 1 | 1 | 1 | 1 | 1 | 0 |
| 1 | 0 | 0 | 0 | 0 | 0 | 0 | 1 |
| 1 | 0 | 1 | 0 | 0 | 1 | 0 | 1 |
| 1 | 1 | 0 | 0 | 1 | 0 | 0 | 1 |
| 1 | 1 | 1 | 0 | 1 | 1 | 0 | 1 |

FIG. 4.

| C | D | $\overline{C}$ | D | $\overline{C}D$ | $\overline{\overline{C}D}$ (Output of Gate 2) |
|---|---|---|---|---|---|
| 0 | 0 | 1 | 0 | 0 | 1 |
| 0 | 1 | 1 | 1 | 1 | 0 |
| 1 | 1 | 0 | 1 | 0 | 1 |
| 1 | 0 | 0 | 0 | 0 | 1 |

FIG.5.

| PRESET RESET NUMBER | FIRST DIGIT BINARY REPRESENTATION OF THE PRESET RESET NUMBER — A | FOURTH DIGIT BINARY REPRESENTATION OF THE PRESET RESET NUMBER — B | ZERO REPRESENTS ONE SKIPPED SIGNAL DURING THE RESET NUMBER'S CYCLE — C | ONE REPRESENTS THREE SKIPPED SIGNALS DURING THE RESET NUMBER'S CYCLE — C | TERMINAL COUNT OUTPUT — D | A | B | C | CD | C | (C̄D)(ABC̄) OUTPUT OF GATE 3 | | | |
|---|---|---|---|---|---|---|---|---|---|---|---|---|---|---|
| 9  | — | — | ∅ | — | ∅ | ∅ | ∅ | ∅ | ∅ | — | ∅ | — | — | — |
| 10 | ∅ | — | ∅ | — | ∅ | ∅ | ∅ | — | ∅ | ∅ | — | — | — | — |
| 11 | — | — | ∅ | — | ∅ | ∅ | — | ∅ | ∅ | — | — | — | — | — |
| 12 | ∅ | — | ∅ | — | ∅ | — | — | ∅ | — | ∅ | ∅ | ∅ | ∅ | ∅ |
| 13 | — | — | ∅ | — | ∅ | — | — | — | ∅ | — | — | — | — | — |
| 14 | ∅ | — | ∅ | — | ∅ | — | ∅ | ∅ | ∅ | ∅ | — | — | — | — |
| 15 | — | — | ∅ | — | — | — | — | — | ∅ | — | — | — | — | — |

FIG.6.

$$\left[\overline{(\overline{CD})}\right]\left[\overline{(\overline{ABC})}\right]\left[\overline{E}\right]$$

OUTPUT OF GATE 4 "AND" GATED WITH Ē

NEGATED OSCILLATOR OUTPUT

EXCEPTION TO DUPLICATE Ē (15 SKIP 0) AT THE OUTPUT OF GATE 3, SET A–C TO 1

| Ē | A | B | C | CD 00 | 01 | 11 | 10 |
|---|---|---|---|----|----|----|----|
| 1 | 0 | 0 | 0 | 1  | 0  | 1  | 1  |
| 1 | 0 | 0 | 1 | 1  | 0  | 1  | 1  |
| 1 | 0 | 1 | 0 | 1  | 0  | 1  | 1  |
| 1 | 0 | 1 | 1 | 0  | 0  | 0  | 0  |
| 1 | 1 | 0 | 0 | 1  | 0  | 1  | 1  |
| 1 | 1 | 0 | 1 | 1  | 0  | 1  | 1  |
| 1 | 1 | 1 | 0 | 1  | 0  | 1  | 1  |
| 1 | 1 | 1 | 1 | 1  | 0  | 1  | 1  |

FIG. 7.

SKIP COUNT CLOCK GENERATOR

BACKGROUND OF THE INVENTION

1. Field of the Invention

This invention relates to a Skip Count Clock Generator.

2. Description of the Prior Art

When multiple frequencies of clock pulses are required for a given device, a common approach has been to obtain a variable frequency generator which is subsequently tuned to the desired frequency. However, the relatively high cost of variable frequency generators makes them economically impractical for accompanying mass produced devices using different frequencies.

A practical solution to the multiple clock frequency generation problem was presented by C. E. Lenz in his patent entitled, Digital Reference Source, U.S. Pat. No. 3,378,692, patented Apr. 16, 1968. Lenz's device generates different clock frequencies from a master clock frequency generator using a counter to determine when the output wave form should rise and fall. However, Lenz limited his circuit's variability to the generation of simple fractions (½, ⅓, ¼, 1/5, etc.) of the master clock. In contrast, the applicant's invention allows its user to select the number of clock pulses to be skipped (one of 5, 3 of 7, etc.) so a desired fractional frequency may be obtained from the master clock frequency generator.

A patent to J. D. Bagley entitled, Variable Pattern Pulse Generator, U.S. Pat. No. 3,198,358, patented July 20, 1965, made multiple clock pulse frequencies of varying fractions available to his circuit's user. Unlike the applicant's device, though, the Bagley invention incorporated delay feedback loop circuits which were uniquely constructed to delay generator clock pulses a predetermined multiple of pulse periods before those remaining pulses reached the invention's output. These delayed devices were combined with bistable flip-flop circuits to produce a recurrent pulse pattern of predetermined pulses and blank positions. The applicant's device employs no delay feedback loops which require reconstruction for different frequencies nor are bi-stable flip-flops used to generate desired base frequency fractions. Instead, a presettable, reset counter and skip logic circuitry are gated with the base frequency generator so an operator can quickly and easily set the counter and skip number for a chosen base frequency fraction. Also, the absence of delaying circuitry allows the leading and trailing pulse edges to be transmitted in a substantially unaltered fashion.

Other approaches to pulse skipping have appeared in timing circuits where an output pulse at a specific instant was required to initiate a required response. However, these devices were not intended to generate multiple clock frequencies.

SUMMARY OF THE INVENTION

A skip count clock generator yielding multiple frequencies of clock pulses for variably driving a scanner to produce a required resolution of scanned data includes a base frequency generator of clock pulses. To count the generated clock pulses and establish their periodic cycle, a presettable, reset logic counter is used for designating the number of clock pulses to be counted prior to resetting. To obtain a desired fraction of the clock pulse period, electronic logic components are responsive to the presettable, reset logic counter to skip any chosen whole number of clock pulses generated between the counter's preset and reset values.

For increased latitude in scanned data resolution, additional frequencies are made available by further dividing the fraction of the clock pulse period. A counter divides the period fraction by whole powers of two. Then a data select chooses the counter output having as the divisor the desired power of two of the clock pulse period fraction.

DETAILED DESCRIPTION

Conceptually, a variety of frequencies may be needed to obtain a desired degree of quality resolution from a scanner of data. Such a need may be fulfilled by an embodiment of the block diagram in FIG. 1 without requiring multiple frequency generators which may be numerous, expensive, and bulky.

Figure 1:
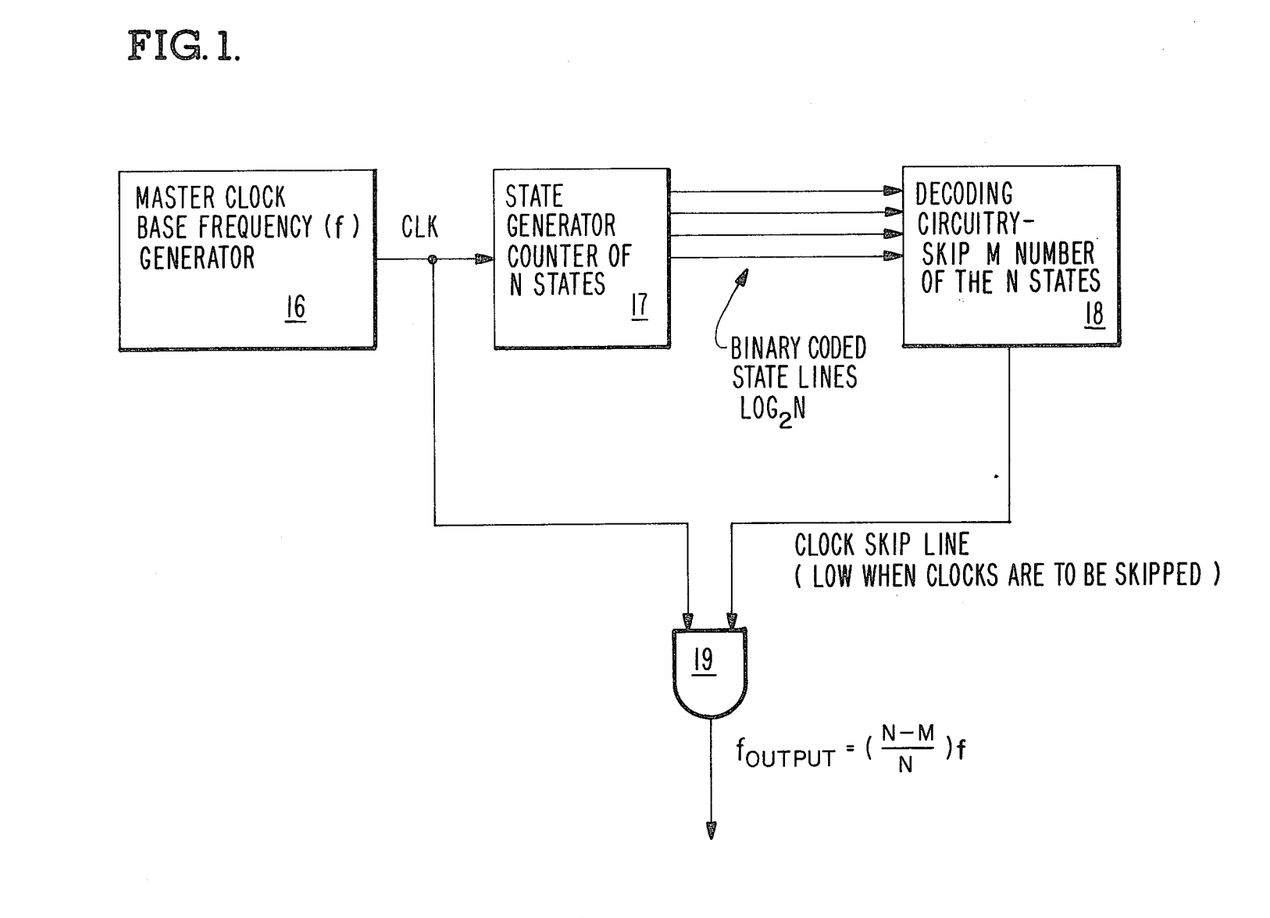
FIG. 1 is a block diagram depicting the general embodiment of a skip count clock generator wherein a desired number of skipped clock pulses may be set.

Referring to FIG. 1, the applicant's skip count clock generator includes a master clock base frequency generator 16 to furnish the train of clock pulses at a frequency for driving the data scanner. The pulses from the master clock 16 are then counted by state generator counter 17 which is programmable to reset its count of the clock pulses after a desired number of outputs have been received by the counter. This number of clock pulses counted prior to resetting determines the number of states N from which a selected number M of pulses are skipped in decoding circuitry 18. The outputs of the decoding circuitry 18 and the master clock base frequency generator 16 are subsequently logic AND gated together to yield the desired output frequency $f_O$ to drive a data scanner. The relationship between the base frequency f, the number of states N, and the number of states to be skipped M to obtain the desired output frequency $f_O$ is defined by the equation:

$$f_O = f \frac{(N - M)}{N}.$$

Consequently, if an output frequency of 21.3 megahertz is needed to drive the available scanner and the output of the circuit's base frequency generator is 32 megahertz with the counter set to reset after receiving three clock pulses from the base frequency generator, the equation appears as follows:

$$21.3 \text{ mHz} = 32 \text{ mHz} \frac{(3 - M)}{3}.$$

Solving for M, the number of pulses to be skipped to yield the desired output frequency is:

$$M = 3 - \frac{21.2}{32}(3) = 1.$$

Figure 2:
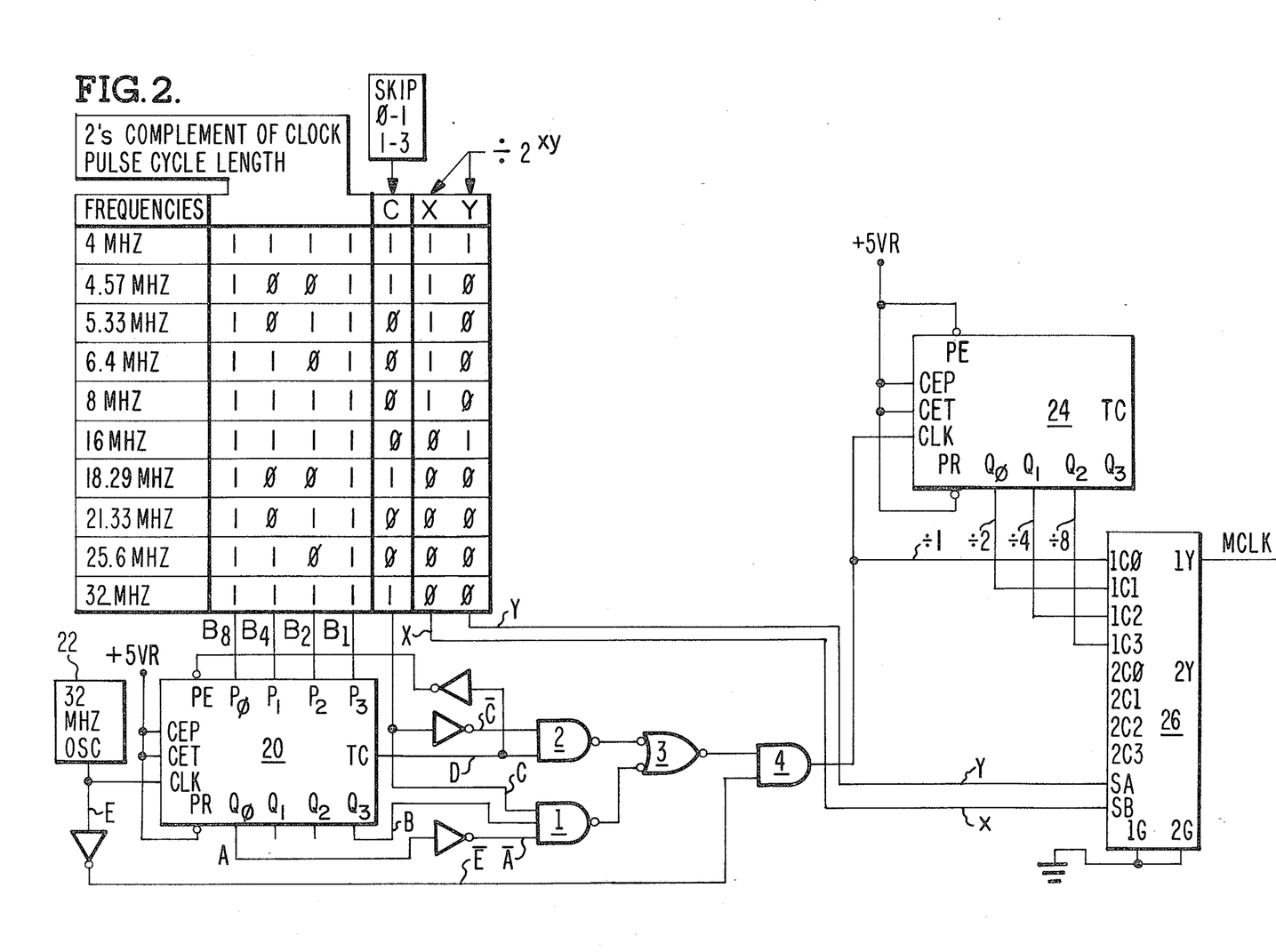
FIG. 2 is a circuit depicting a specific embodiment of a skip count clock generator.

A specific embodiment of the general skip count clock generator of FIG. 1 appears in FIG. 2. The presettable four bit counter 20 (74S161, manufactured by Texas Instruments Incorporated, P.O. Box 5012, Dallas, Tex. 75222) counts clock pulses from the base frequency clock pulse generator 22 (part no. K1115A, manufactured by Motorola Semiconductor Products, Inc., P.O. Box 20924, Phoenix, Ariz. 85036). To preset the counter 20 with a binary number to which the counter resets after registering a count of 15, preset inputs $P_0$, $P_1$, $P_2$, and $P_3$ are provided. Consequently, if the preset inputs are set to the binary equivalent of nine, 1001, the counter 20 would essentially count 9, 10, 11, 12, 13, 14, 15, 9, 10, 11, etc. As can be seen by reference to the frequency diagram of FIG. 7, presetting the counter to nine (1001) results in a cycle having seven pulse places (The 2's complement of 1001 is 10000-1001 or 0111.) prior to resetting. Similarly, a preset value of 13 (1101 in binary) has a cycle of three pulse places (10000-1101 or 0011). This preset number for the counter 20 is used as the denominator of the desired base frequency fraction.

The numerator of this base frequency fraction in the circuit of FIG. 2 is limited to the values of one or three as represented by the logic level inputs zero and one respectively. These inputs, designated by the letter C in FIGS. 2-6, determine the number of pulse places to be skipped within a cycle.

Figure 6:
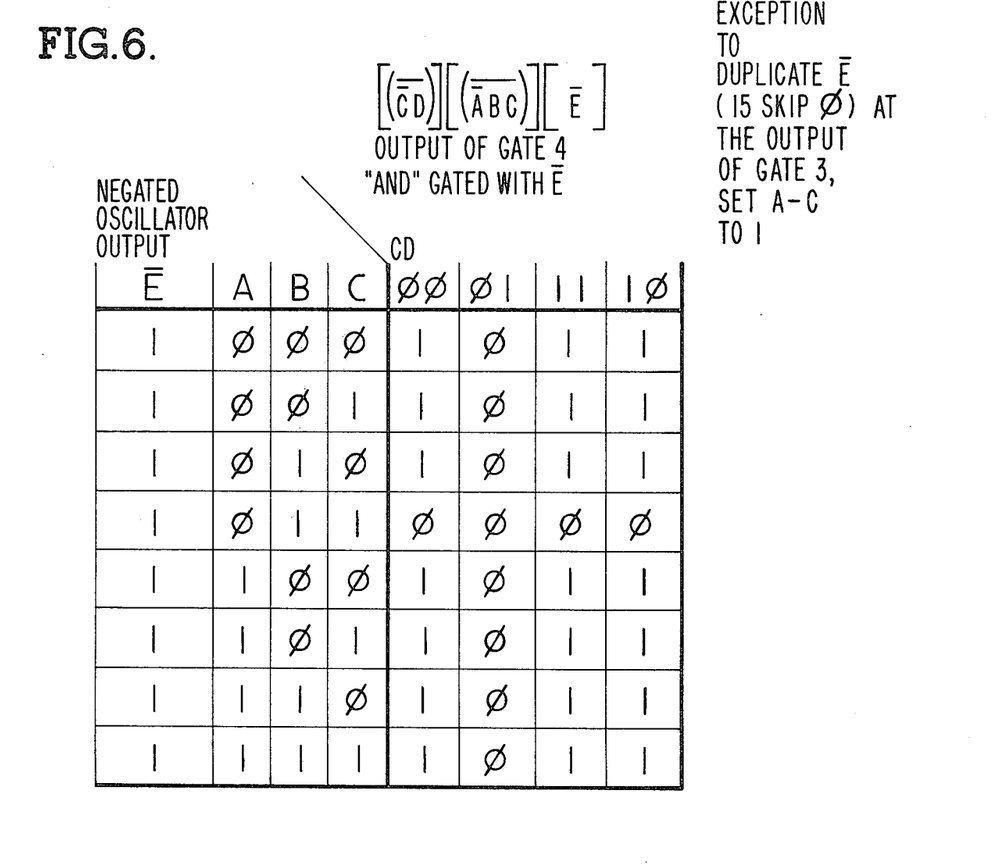
FIG. 6 depicts the truth tables of the logic inputs to and the resulting logic outputs from gate 4 of FIG. 2.
Figure 7:
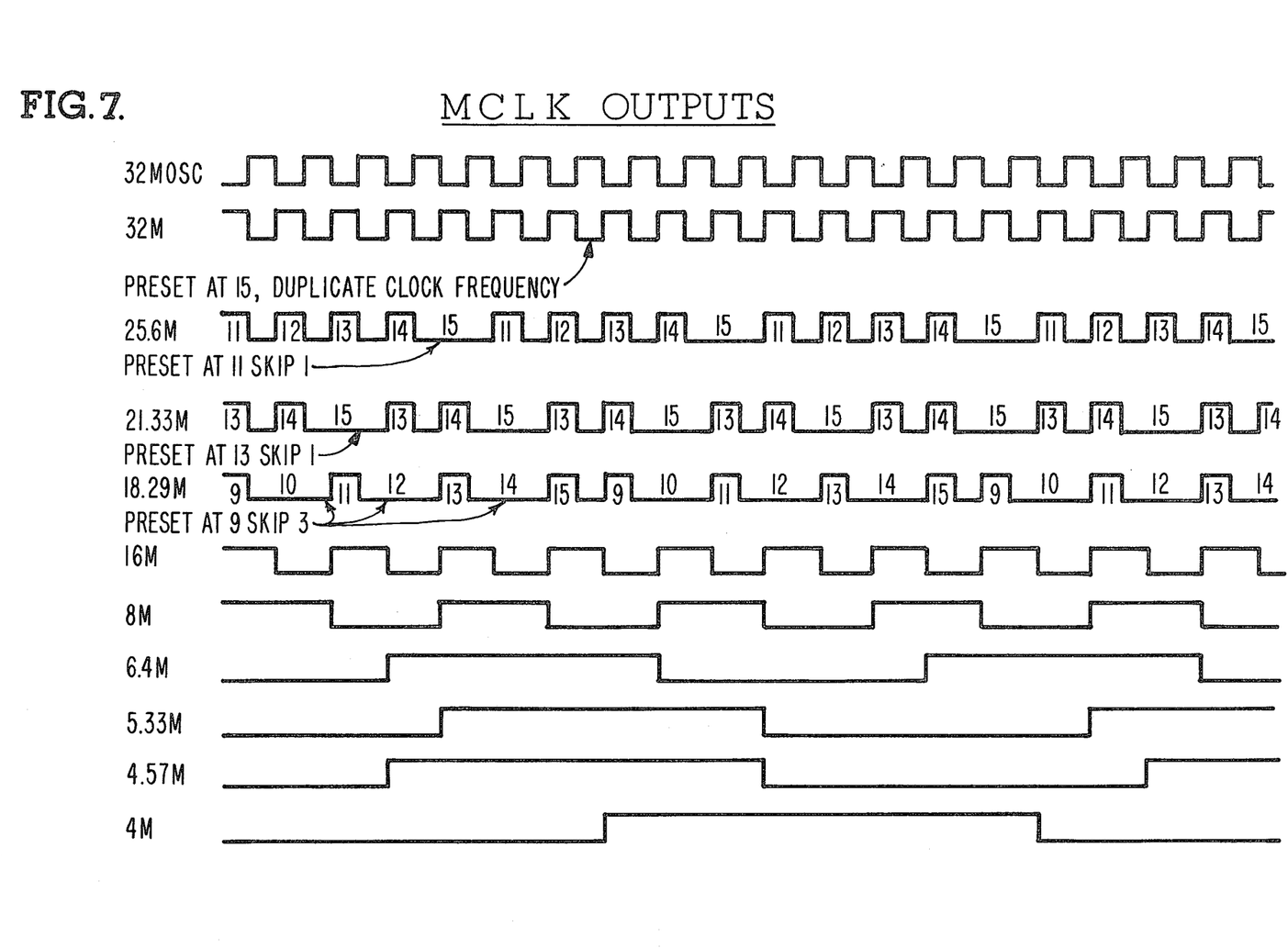
FIG. 7 is a representation of base frequency fractions generated by the circuit of FIG. 2.

The one exception to the above general scheme of selecting a base frequency fraction is when an operator requires the base frequency as the output of gate 4 (FIG. 2). For such an output, inputs A through C and preset inputs $P_{0-3}$ must be set to logic level one (FIG. 6). Since counter 20 outputs a logic level one on the next clock pulse after the terminal count of 15 is reached, commanding the counter to continually reset with each clock pulse causes a duplication of that clock pulse frequency (FIG. 7).

Figure 3:
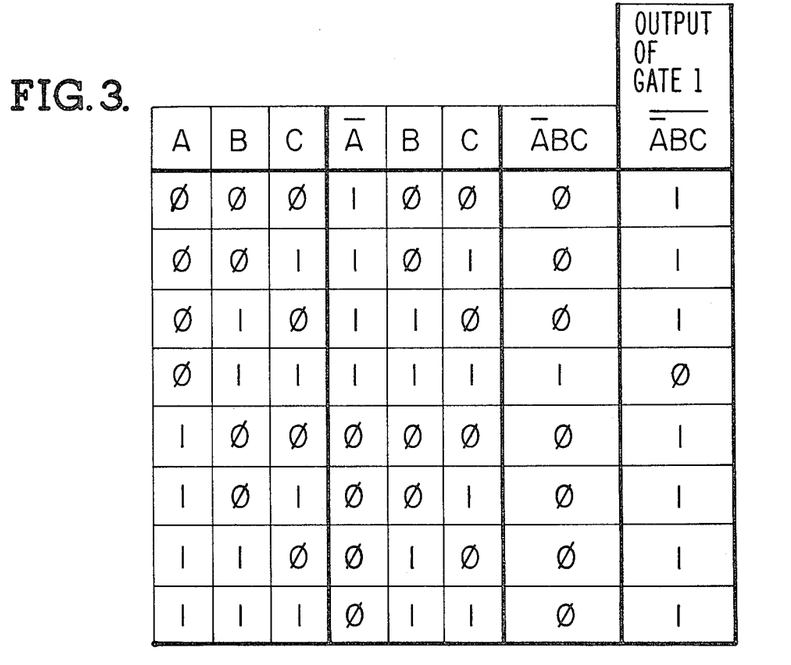
FIG. 3 depicts the truth tables of the logic inputs to and resulting logic outputs from gate 1 of FIG. 2.

Referring to FIG. 2, the free running base clock frequency generator 22 feeds clock pulses to counter 20 which counts from the preset binary number set on inputs $P_{0-3}$ to the terminal count of 15 (1111). This binary counting is reflected at outputs $Q_{0-3}$. The outputs from $Q_0$ and $Q_3$ are designated in the truth tables of FIGS. 3 through 5 as A and B respectively and are fed into NAND Gate 1 (74S10, manufactured by Texas Instruments Incorporated). A third input to Gate 1 is the pulse place skip number designated as C. The outputs of Gate 1 in response to the A, B, C inputs are shown in FIG. 3.

Figure 4:
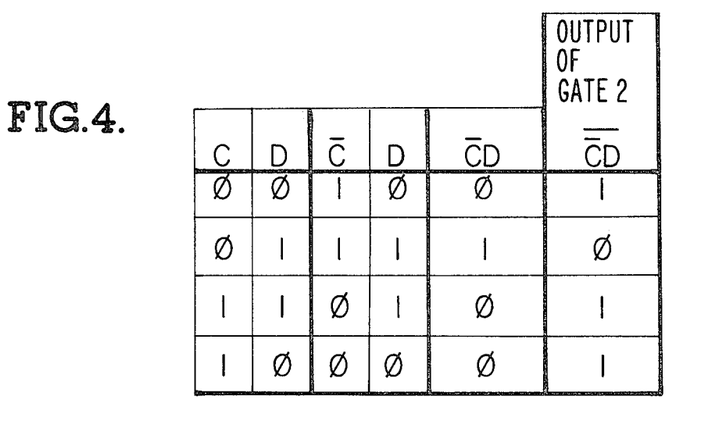
FIG. 4 depicts the truth tables of the logic inputs to and the resulting logic outputs from gate 2 of FIG. 2.
Figure 5:
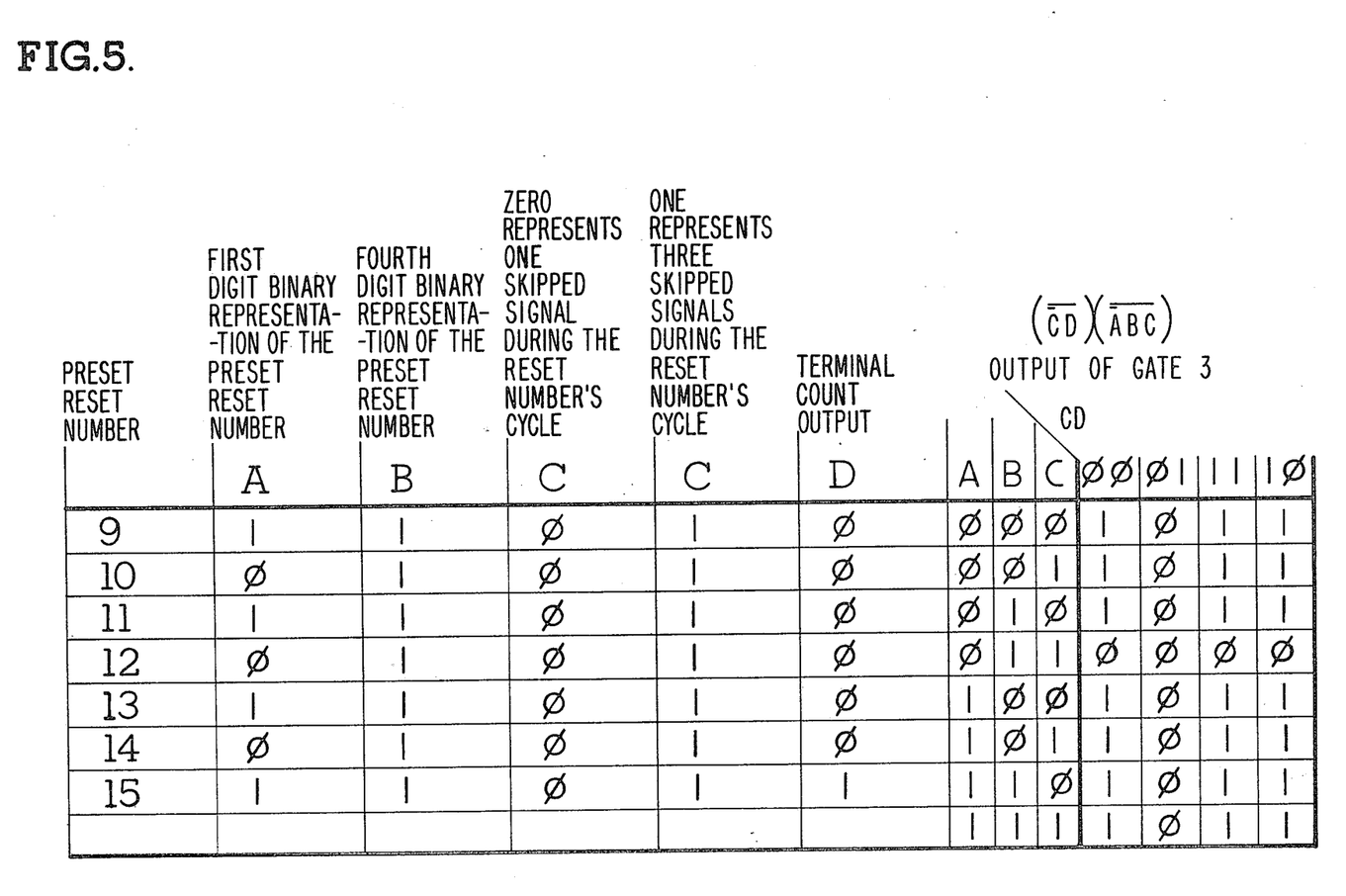
FIG. 5 depicts the truth tables of the logic inputs to and the resulting logic outputs from gate 3 of FIG. 2.

NAND Gate 2 (74S00, manufactured by Texas Instruments Incorporated) receives the pulse place skip number, designated as $\overline{C}$, and the terminal count of counter 20 designated as D. D remains at a logic value of zero at all times except when the terminal count of 15 (1111) is reached. When that count appears at outputs $Q_0$ through $Q_3$, the value of D jumps to a logic level of 1. The outputs of Gate 2 for the possible values of C and D are shown in FIG. 4.

The outputs of Gates 1 and 2 serve as inputs to Gate 3 (74S08, manufactured by Texas Instruments Incorporated). The resulting output of Gate 3 (FIG. 5) is then AND gated at Gate 4 (74S08, manufactured by Texas Instruments Incorporated) with the negated output of the base clock frequency generator 22 designated as E. The outputs of this gating appear in FIG. 6. By reference to the frequency diagrams of FIG. 7, the logic level of the generated clock pulses E will always be zero (therefore $\overline{E}$ will always be one) at the times corresponding to the counts of counter 20 (FIG. 2). This recurrent value results from the falling edges of the clock pulses from the base clock frequency generator 22 supplying the triggering inputs to counter 20. Therefore, counter 20 only increments its count when a clock pulse from the frequency generator 22 makes the logic level transition from one to zero.

The output of Gate 4 is represented by the 32, 25.6, 21.33, and 18.28 MHz frequency patterns illustrated in FIG. 7. To permit further division of these frequencies, the output of Gate 4 is fed to the clock input of a second counter 24 (74S161, manufactured by Texas Instruments Incorporated). This second counter 24 reflects the number of incoming clock pulses at outputs $Q_0$ through $Q_3$ and counts these pulses in binary. However, the purpose of the second counter 24 is to evenly divide the incoming clock frequencies by a chosen whole power to two ($2^0$, $2^1$, $2^2$, $2^3$). Therefore, a data select 26 (74S153, manufactured by Texas Instruments Incorporated) is connected to the following: the output of gate 4 (allowing the output to be divided by one and therefore remain unchanged), $Q_0$ (allowing division of Gate 4's output by 2), $Q_1$ (divide Gate 4's output by 4), and $Q_2$ (divide Gate 4's output by 8). To select the power of two divisor for the output of Gate 4, X and Y binary inputs are provided to data select 26. Therefore, with X and Y set to zero (2 to the zero power equals one), data select 26 will transmit the undivided output of Gate 4. With X and Y set to one and zero respectively, this binary representation of the number two causes data select 26 to choose $Q_1$ for the output which divides Gates 4's frequency by four (two to the second power). The result of this division of Gate 4's output appears at the output of data select 26 and is illustrated in the frequency graphs of FIG. 7.

What is claimed is:

1. A clock generator for providing clock pulses at any of a plurality of frequencies by skipping selected pulses in a train of pulses, in which the desired train of clock pulses has a frequency $$f_o = \frac{(N-M)}{N} f_1,$$

where N represents a number of pulses in a predetermined clockpulse cycle, M represents a number of pulses to be skipped, $f_1$ is the basic frequency of an independent oscillator and $f_o$ is the desired frequency, comprising:

means for generating clock pulses at a basic frequency corresponding to $f_1$;

counting means coupled to count a number of clock pulses N above a preset minimum value to establish a clock pulse cycle and provide an output pulse when said N pulses are counted;

means coupling said output pulse to reset said counter to said minimum value and thereby enable a count of N pulses to be repeated to establish N as the number of pulses in said clock pulse cycle;

a source of pulse place skip signals to establish the value M indicating the number of pulses to be skipped;

gating means coupled responsive to said output pulse and said pulse place skip signal to provide a logic pulse designating a pulse to be skipped; and additional gating means coupled responsive to said logic pulse and to said clock pulses at said basic frequency $f_1$ to cause a pulse from among said N pulses to be skipped in order to generate a train of pulses having said desired frequency $f_o$.

2. The invention as claimed in claim 1, in which:

the source of pulse place skip signals provides a value of M designating a plurality of pulses to be skipped;

said counting means provides additional output pulses designating the count at each moment;

other gating means are coupled responsive to said additional output pulses and to said pulse place skip signals to provide other logic pulses designating a plurality of pulses to be skipped; and said additional gating means are coupled responsive to said other logic pulses and to said clock pulses at said basic frequency to cause a plurality of pulses from among said N pulses to be skipped in order to generate a train of pulses having said desired frequency $f_o$.

3. The invention as claimed in claim 1, in which:

the value of M is "1", indicating one pulse is to be skipped, and the value of N is an integer less than 15, whereby, the frequency $f_o$ is a fraction of the frequency $f_1$.

4. The invention as claimed in claim 2, in which:

the value of M is "3", indicating three pulses are to be skipped, and the value of N is less than 15; whereby, the frequency $f_o$ is a fraction of the frequency $f_1$.

5. The invention as claimed in claim 1 in which it is desired to have the output frequency $f_o$ equal to the basic frequency $f_1$, in which:

the counting means is set to a preset minimum value equal to its terminal count;

whereby the counting means will be continuously caused to reset with the next clock pulse and thereby duplicate the clock pulse frequency.

6. The invention as set forth in claim 1, in which:

additional counting means are coupled to the additional gating means to selectively divide the output frequency of the additional gating means by whole powers of two to provide an additional plurality of frequencies; and data select means are coupled to said additional counting means to select the desired one of said additional plurality of frequencies.

7. A skip count clock generator for providing clock pulses at a plurality of frequencies comprising:

means for generating clock pulses at a basic frequency;

counting means including means to receive inputs to preset the counting means at a minimum binary number;

said counting means being coupled to count a predetermined number of said clock pulses above said minimum binary number and provide an output pulse when said number is reached;

means associated with said counting means coupled responsive to said output pulse for resetting the counting means to said minimum binary number to establish a clock pulse cycle having a count equal to said predetermined number;

a source of pulse place skip signals to establish how many pulses are to be skipped;

said counting means providing output signals designating the count at each moment;

gating means coupled responsive to said output signals and said pulse place skip signals to provide logic pulse signals representing the pulses to be skipped; and additional gating means coupled responsive to said logic pulse signals and said clock pulses at the basic frequency to delete pulses from said clock pulses and provide a pulse train at a desired new frequency.

* * * * *

UNITED STATES PATENT AND TRADEMARK OFFICE
CERTIFICATE OF CORRECTION

PATENT NO. : 4,344,036

DATED : August 10, 1982

INVENTOR(S) : Housan Dakroub & David J. Concannon

It is certified that error appears in the above—identified patent and that said Letters Patent is hereby corrected as shown below:

Col. 1, Line 31, patent reads "U.S. Pat. No. 3,198,358" should be --U.S. Pat. No. 3,196,358--.

Signed and Sealed this

Twenty-third Day of November 1982

[SEAL]

Attest:

GERALD J. MOSSINGHOFF

Attesting Officer   Commissioner of Patents and Trademarks